Figure 1:
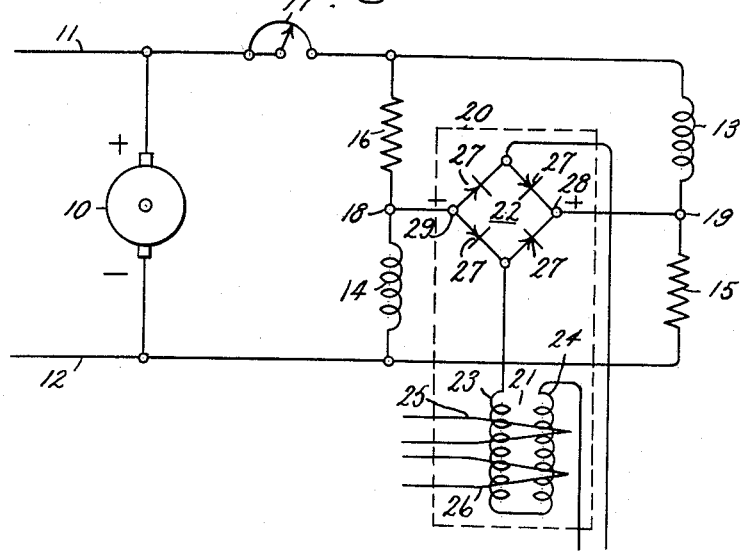

Nov. 29, 1955

G. L. ROGERS 2,725,517

GENERATOR EXCITATION SYSTEM

Filed Aug. 30, 1952

2 Sheets-Sheet 1

Inventor:
George L. Rogers,
by *Charles H. Mott*
His Attorney.

Nov. 29, 1955   G. L. ROGERS   2,725,517
GENERATOR EXCITATION SYSTEM
Filed Aug. 30, 1952   2 Sheets-Sheet 2
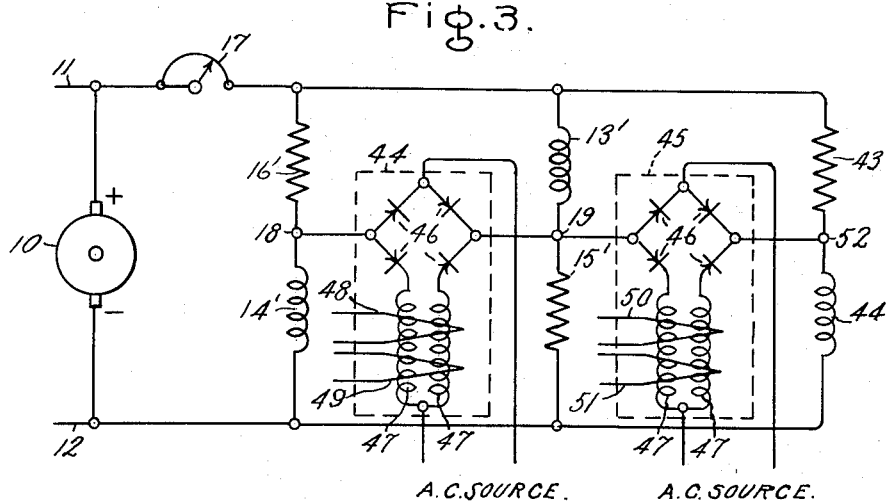
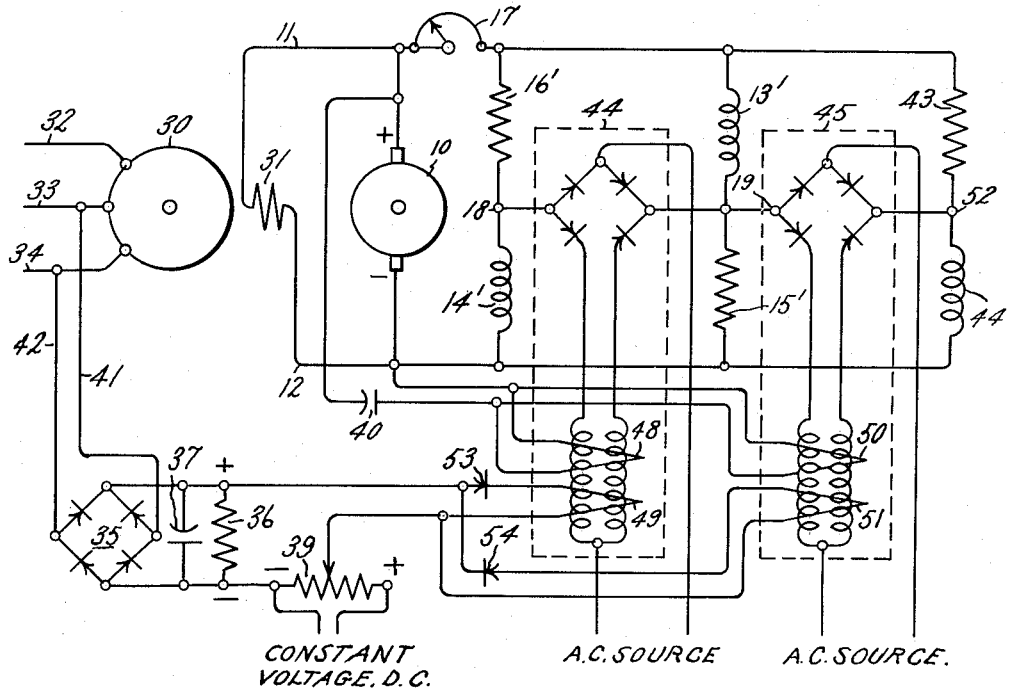
Inventor:
George L. Rogers,
by Claude W. Mott.
His Attorney.

United States Patent Office 2,725,517
Patented Nov. 29, 1955

2,725,517

GENERATOR EXCITATION SYSTEM

George L. Rogers, Schenectady, N. Y., assignor to General Electric Company, a corporation of New York Application August 30, 1952, Serial No. 307,227

4 Claims. (Cl. 322—24)

This invention relates to the systems for controlling the flux in magnetic circuits, and more particularly to arrangements of field windings and associated circuits for controlling the excitation flux of dynamoelectric machines.

The principal object of the invention is to provide a system for energizing a magnetic circuit which requires a minimum amount of power from a controlling source to regulate the flux in the magnetic circuit.

A further object of the invention is to provide an excitation system for a dynamoelectric machine which requires the use of a minimum amount of power from a controlling source to regulate the excitation of the machine.

A more specific object of my invention is the provision of an improved excitation arrangement for a self-excited direct current dynamoelectric machine which is arranged to be controlled by an element of an automatic regulating system, which requires the minimum power output by such element.

Other objects, features, and advantages of the invention will be apparent from the subsequent detailed description of certain preferred embodiments of the invention, while the scope of the invention is set forth in the appended claims.

In applying a control device for controlling the excitation of a direct current dynamoelectric machine, it is desirable to utilize the self-excitation characteristics of the machine to furnish the major portion of the required excitation instead of deriving the energy required for such excitation exclusively from the control device. Various arrangements for doing this are known, among which are (1) introducing the output current from the control device in series with the machine field windings, and (2) utilizing separate field windings on the dynamoelectric machine to carry the current from the control device.

Both of these arrangements have serious drawbacks. The series arrangement has the drawbacks of requiring that for "buck" operation the control device must overcome the resistance drop produced by the self-excitation field current in a series resistor before the control device output current becomes effective, while for "boost" operation the control device must carry the full excitation current. Both of these effects require increased capacity of the control device components over what would be required to perform the control function only. A further drawback of this arrangement is that failure of the control device seriously affects normal self-excitation characteristics.

The separate winding arrangement requires a machine field winding structure which is considerably increased in size because of the additional energy that must be dissipated. With this arrangement the self-excited field winding must have the full normal rating, while the additional field winding or windings for the control device or devices each must have an energy rating equal to the maximum energy which it may be called upon to dissipate. The total energy to be dissipated in the excitation winding structure is the sum of the energy in the self-excited winding plus that in the additional winding or windings. The failure of a control device by open circuiting does not seriously affect self-excitation characteristics with this arrangement, but the short circuiting of a control device may introduce a large time constant into the control circuits.

In order to overcome the drawbacks of the above-discussed arrangements, I have evolved certain bridge circuit arrangements of field windings which are useful with self-excited direct current dynamoelectric machines and also with other dynamoelectric machines and with magnetic circuits which are not a portion of a dynamoelectric machine. In one preferred form of the invention I divide the self-excitation field of a rotating direct current generator into two sections, each having half the turns and half the resistance of the full winding. Two resistors, each having a value of resistance equal to the said half winding resistance value, are connected in series respectively with the two field winding sections. One resistor is connected between the positive terminal of the generator and one of the field winding sections, while the other resistor is connected between the other field winding section and the negative terminal of the generator, the two field winding sections being arranged thus for energization in parallel by the generator output potential. A control device which may, for example, be a magnetic amplifier is connected between the common junction of the first field winding and the first resistor and the common junction of the second field winding section and the second resistor for circulating control current simultaneously through both field winding sections.

Figure 2:
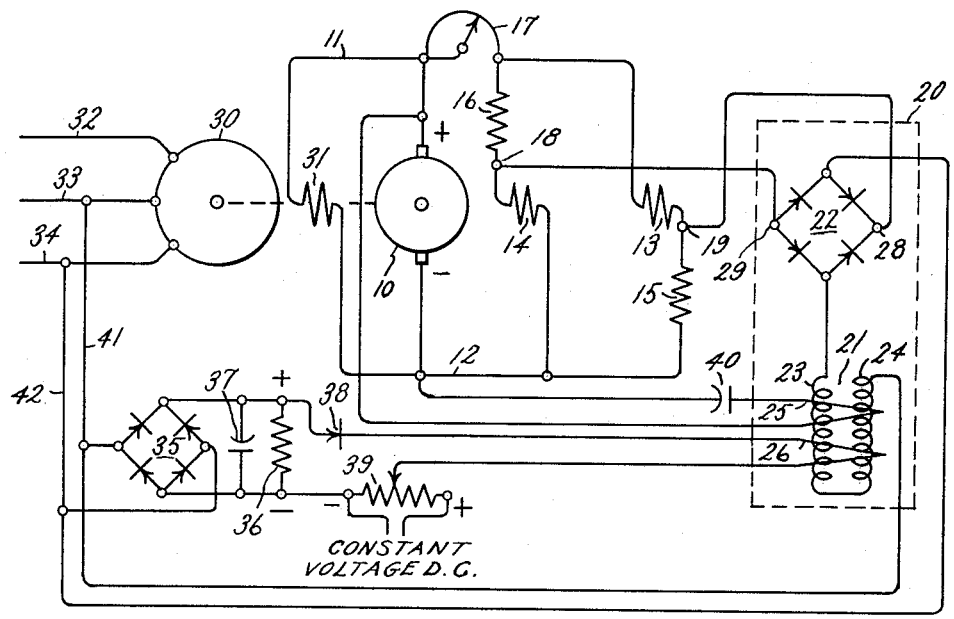

For a clearer and more complete understanding of my invention reference should be had to the accompanying drawing in which Fig. 1 is a simplified schematic electrical circuit diagram of the embodiment of the invention discussed in the preceding paragraph; Fig. 2 shows the excitation arrangement of Fig. 1 incorporated in a generator voltage regulating system; Fig. 3 is a simplified schematic electrical circuit diagram showing another preferred embodiment of the invention; while Fig. 4 shows the arrangement of Fig. 3 incorporated in an automatic voltage regulating system.

Referring to Fig. 1 of the drawing there is shown a direct current generator 10 and a pair of conductors 11 and 12 connected respectively to the positive and negative polarity terminals of the generator armature. The machine 10 is self-excited by means of a pair of field windings 13 and 14 each having half the turns and half the resistance of a single winding normally required for full excitation. An impedance device, which is shown as a resistor 15, is connected in series with the field winding 13 between the field winding and the negative conductor 12, while a second impedance device 16 which is preferably a second resistor having equal value of resistance to resistor 15, is connected in series with winding 14 between positive potential conductor 11 and winding 14. An exciter field rheostat 17 may be connected in circuit with the field windings, as shown, in order to provide excitation for generator 10 in a substantially conventional manner, the amount of excitation depending upon the adjustment of field rheostat 17. It will be understood that field windings 13 and 14 are arranged on the magnetizable structure of machine 10, specifically on the field poles, in such a manner that a change in current due to the adjustment of field rheostat 17 affects the magnetomotive forces of both windings 13 and 14 and the components of magnetic flux produced by them in the machine magnetic circuit in the same sense, i. e., a change in the setting of rheostat 17 causes the flux components produced by both field windings to increase simultaneously and decrease simultaneously.

Between the common junction 18 of resistor 16 and field winding 14 and the common junction point 19 of field winding 13 and resistor 15, I have connected a magnetic amplifier 20. As shown, magnetic amplifier 20 comprises a saturable reactor 21 (core structure not shown) having a pair of load windings 23 and 24 and a pair of control or saturating windings 25 and 26 arranged in conventional manner on the magnetizable core, and a bridge-type full-wave rectifier 22 composed of four identical unidirectional devices 27 which are preferably of the selenium or copper oxide dry type. Magnetic amplifier 20 is supplied with alternating current at a constant voltage, as indicated in the drawing, and the output terminals 28 and 29 of the bridge rectifier 22 are so arranged that the positive terminal 28 is connected to junction 19 while negative terminal 29 is connected to junction 18.

In the operation of the arrangement of Fig. 1 to provide excitation for machine 10, the field rheostat 17 is set for the desired maximum (ceiling) excitation level. Variation of the output voltage of generator 10 is then obtained by operation of the magnetic amplifier 20, it being understood that an increase in the saturation of the core of saturable reactor 21 caused by control windings 25 and 26 produces an increased load current through windings 23 and 24 which appears as unidirectional current at terminals 28 and 29 of the magnetic amplifier. One component, comprising approximately one half of such unidirectional current, circulates from terminal 28 through field winding 13 and resistor 16 in series, while the remainder circulates simultaneously through the parallel circuit of resistor 15 and field winding 14 in series; the two components are reunited again at the junction 18, from which the amount flows to the negative terminal 29 of the magnetic amplifier. These current components are superimposed on and in the reverse direction to the self-excitation current components through windings 13 and 14. The result is a reduction in the net current in each of the field windings and a reduction in the output voltage of generator 10.

In addition to the direct reduction in generator voltage caused by the current from the magnetic amplifier, just described, a regenerative action is obtained in that a reduction in potential between conductors 11 and 12 reduces the self-excitation and thus reduces further the output voltage of generator 10. Because of the curvature in the generator characteristic (curve of output voltage versus field current), the generator voltage stabilizes at a voltage lower than the initial value following an increase in current from the magnetic amplifier 20, as described, with the magnetic amplifier furnishing the excitation differential between that obtained by self- excitation and that required to maintain the new voltage level.

In connection with the foregoing, it should be understood that with the magnetic amplifier arrangement illustrated in Fig. 1, there is at least a small current flow continuously from magnetic amplifier 20, because it is not possible to shut this device off completely except by opening the circuit to the source of alternating current. Also, with this arrangement, a reduction in the current from the magnetic amplifier acts inversely to the operation described and causes an increase in the armature voltage of generator 10.

With the excitation system of Fig. 1, the power output of the magnetic amplifier is less than would be required for the same extent of generator voltage control under the same conditions by the previously discussed series resistor arrangement, i. e., by a resistor connected in series with a single field winding and a magnetic amplifier as a control device connected in shunt with the resistor to reduce the self-excitation after the magnetic amplifier output had increased sufficiently to overcome the resistance drop produced by the self-excitation field current in the series resistor. In addition, with the disclosed arrangement, failure of the magnetic amplifier does not disturb the self-excitation characteristics of the circuit since an open circuit in the magnetic amplifier is equivalent to no output from the magnetic amplifier, while a short circuit in the magnetic amplifier connects junction points 18 and 19 which are at the same potential.

The arrangement of Fig. 1 is operative if the resistances of resistors 15 and 16 are not equal to the resistances of the field windings 13 and 14, but in such case increased power output from the magnetic amplifier 20 is required. Assuming that the resistance values of 15 and 16 are equal and both are greater than the resistance values of 13 and 14 which are also equal, there is a potential difference between junctions 19 and 18 of a certain value with junction 19 at positive potential. Under these circumstances, the self-excitation principle is not affected appreciably, but the current output from the magnetic amplifier must increase a predetermined amount before the magnetic amplifier becomes effective in controlling the excitation of generator 10. This is similar in effect to the previously discussed series resistor arrangement with the magnetic amplifier in shunt with the series resistor, but still permits the use of a smaller magnetic amplifier than the series resistor arrangement providing the resistance by the two field windings and the two impedances are within the usual ranges. Should the resistance values of impedances 15 and 16 be less than the resistance values of windings 13 and 14, the junction 18 is of a higher positive polarity than junction 19, and a part of the self-excitation field current flows through bridge rectifier 22 and must be overcome by the magnetic amplifier before control of the generator excitation by the magnetic amplifier can begin. With other types of unbalance among the resistances of 13, 14, 15 and 16, similar results ensue, with the values and polarities being determined by the amount and sense of the unbalance.

It will be readily apparent to those familiar with generator excitation circuits that the arrangement shown in Fig. 1 can be changed for "boost" operation instead of "buck" operation as illustrated and described merely by reversing the bridge rectifier 22 so that terminal 29 of the bridge rectifier is connected to junction 19 and terminal 28 is connected to junction 18. With this modified arrangement the output current from the magnetic amplifier 20 adds to the self-excitation current in windings 14 and 13. With this modified arrangement, the field rheostat 17 is set for a minimum exciter voltage level instead of maximum, and the magnetic amplifier 20 under the control of windings 25 and 26 boosts or adds to the generator excitation sufficiently to maintain the generator output voltage at the selected value.

The generator excitation system of Fig. 1 is shown in Fig. 2 embodied in a condition regulating system for a generator 30 which is illustrated as a three phase alternating current machine having an excitation winding 31 and three armature terminal conductors 32, 33 and 34. In Fig. 2, the direct current generator 10 acts as the exciter for alternating current generator 30, the output conductors 11 and 12 of machine 10 being connected to excitation winding 31 of the alternating current machine. The excitation system of machine 10 in Fig. 2 is the same as in Fig. 1, including the connections of field windings 13 and 14 with impedances 15 and 16 and magnetic amplifier 20, although in Fig. 2 field windings 13 and 14 of machine 10 are shown on the axis of machine 10 in a more conventional manner. Machine 10 is shown in Fig. 2 mechanically direct-connected to generator 30 for rotation simultaneously therewith in one conventional arrangement but it will be understood that exciter 10 may be separately driven if desired. The alternating current generator may be driven by any suitable means (not shown) such as a steam turbine, hydraulic turbine, diesel engine, electric motor, and the like.

To provide a regulating system for the armature voltage of generator 30 (the armature voltage being illustrative of a condition of the generator which may be regulated), means are provided for deriving a voltage signal proportional to the voltage to be regulated. Additional means are provided for deriving a reference voltage, and the difference between the two voltages is applied to control winding 26 of the magnetic amplifier. As illustrated, a pair of conductors 41 and 42 are connected to generator terminal conductors 33 and 34 respectively and a full-wave bridge type rectifier 35 is connected between conductors 41 and 42 for deriving a unidirectional potential proportional to the potential between conductors 33 and 34. This unidirectional potential, having polarities as indicated, appears across the resistor 36, while a capacitor 37 may be provided, if desired, to filter the unidirectional current from rectifier 35 and smooth out the ripple therein caused by rectifier 35. The reference voltage is provided by an adjustable resistor 39 which is connected to a source of constant potential unidirectional current with polarities as shown in Fig. 2.

When the potential drops across resistors 36 and the active portion of resistor 39 are equal, no current flows through control winding 26. When the potential drop across resistor 36 exceeds that across 39, current flows through control winding 26 in a direction which, it is assumed, increases the core saturation of the magnetic amplifier and thus increases the output of the magnetic amplifier. With the bucking or subtractive arrangement illustrated, it is desired that current flow through control winding 26 only in one direction; therefore, rectifier 38 is included in the circuit to this control winding so that when the reference voltage drop across resistor 39 exceeds that across 36, no current flows through winding 26.

To complete the regulator system a degenerative feedback circuit including control winding 25 of the magnetic amplifier is connected across the output terminals of generator 10. A capacitor 40 is included in this circuit so that the feedback circuit responds to transient signals only. Thus control winding 25 acts as a stabilizing or anti-hunt winding for the regulator.

The system illustrated in Fig. 2 automatically maintains the voltage between conductors 33 and 34 of generator 30 at a predetermined value corresponding to the setting of adjustable resistor 39 which provides the reference voltage. If the voltage between 33 and 34 drops for any reason, the current through control winding 26 of the magnetic amplifier decreases due to a decrease in the amount by which the potential drop across resistor 36 exceeds that across resistor 39. This decreases the output of the magnetic amplifier 20 and reduces the amount by which the magnetic amplifier output counteracts the self-excitation of generator 10, thereby increasing the output voltage from generator 10 and increasing the excitation voltage of generator 30 until the terminal voltage of generator 30 is restored to the desired value. For an initial increase in the output voltage of generator 30, the system works in exactly the opposite manner to reduce it again to the selected value.

Referring next to Fig. 3 of the drawing, there is shown a modified excitation system which is similar to Fig. 1 except that the field winding has been separated into 3 parts connected in a multiple bridge arrangement. Preferably with this system each of the three field windings is proportioned so as to produce one-third of the ampere turns required for the excitation of generator 10 at one-half of the voltage of a single field winding. In Fig. 3 two of the field windings and two of the impedances are designated by 13', 14', 15' and 16', respectively, to show that these components are similar to the correspondingly numbered components in Fig. 1, but modified slightly as just mentioned. The additional impedance and field winding making up the third parallel group in this figure are designated 43 and 44, respectively, while the common junction between 43 and 44 is designated by the numeral 52, the junctions between the other pairs of impedances and field windings being designated 18 and 19 the same as in Fig. 1.

In Fig. 3, two magnetic amplifiers are shown, one designated 44 and connecting junctions 18 and 19, and the other designated 45 and connecting juictions 19 and 52. In this figure, both of these magnetic amplifiers are of the self-saturating type, each comprising four unidirectional conducting devices 46 in bridge connection, and a pair of load windings 47 connected respectively in different branches of the bridge circuit. Sself-saturating magnetic amplifier or amplistat 44 has a pair of control or saturating windings 48 and 49 while amplistat 45 has a pair of control windings 50 and 51. It will be underestood by those familiar with self-saturating magnetic amplifiers that the load windings and control windings for each of the amplistats are positioned on a common saturable core which may be of the three-legged type, the double toroid type, the four-legged type, or other conventional arrangement, although the three-legged type with the two load windings on the outer legs and the control windings on the center leg is in most general use at the present time. Additional details of the operation of such self-saturating magnetic amplifiers or amplistats are given in Patent 2,525,451 Graves issued on October 10, 1950 and assigned to the same assignee as the present application.

The amplistats 44 and 45 are supplied with alternating current from suitable sources, as indicated, which preferably are maintained at constant potential. However, it is important to note that the sources must be separate, because if these two amplistats are connected in parallel to the same source, a short circuit will result between the rectifier portions of the amplistats through common terminal 19.

As connected in Fig. 3, amplistat 44 is the "bucking" or subtractive control device and amplistat 45 is the "boosting" or additive control device. Upon an increase in the saturation of the core of either of these amplistats, responsive to an increase in current in one of the control windings with which each is equipped, they produce respectively decreased and increased output voltages from generator 10. They act in a similar manner to that described for Fig. 1, magnetic amplifier 44 bucking the self-excitation of the generator and thus reducing the generator output voltage while magnetic amplifier 45 boosts the self-excitation and thereby increases the generator voltage.

The operation of each of the individual amplistats in Fig. 3 is modified in one respect from that of Fig. 1, however, in that each bucks (or boosts) the self-excitation current in only one of the field windings and not in two. Assuming, for example, that the "buck" amplistat 44 is active and is producing controlling current, such current flows from junction 19 back to junction 18 through two parallel paths one of which includes resistor 16' while the other includes field winding 14'. The circuit which includes resistor 16' also includes winding 13 and resistor 43 in parallel, while the circuit including winding 14' also includes resistor 15' and winding 44 in parallel. With this balanced arrangement, assuming that the resistances of unidirectional conducting devices 36 are negligible, a subtractive component of control current flows in winding 13' while an additive component which exactly counteracts it flows in winding 44. Thus, the subtractive component of current in winding 14' alone is effective to reduce the exciter voltage. It is pointed out, however, that the regenerative effect previously described in connection with Fig. 1 applies to all three field windings, i. e., once the action of winding 14' has reduced the exciter output voltage by a predetermined increment, the output voltage is further reduced by an additional increment due to reduced current in all three of field windings 14', 13' and 44.

The excitation arrangement shown in Fig. 3 has the same advantages as that of Fig. 1. For example, the failure of either amplistat either by open circuiting or short circuiting does not adversely affect the operation of the other amplistat or the self-excitation characteristics of the generator. The arrangement of Fig. 3 necessitates increased dissipation of energy by one of the field windings, and in the example of the operation of this circuit just described this is winding 44 because of the increased current in winding 44. However, the energy dissipation required by winding 13' is reduced the same amount because of the reduction of current in this winding, so that the net dissipation by these two windings remains unchanged. During boost operation, i. e., when amplistat 45 is in controlling operation and amplistat 44 is not, dissipation by winding 13' is increased and dissipation by winding 14' is decreased in a similar manner.

The excitation arrangement illustrated in Fig. 3 is subject to variation in characteristics the same as Fig. 1 by varying the proportions of the various impedances and field windings. Also, it is recognized that other combinations of control devices, field windings and impedances may be utilized. For example, four field windings may be used with two amplistats, one pair of fields and one amplistat being connected as in Fig. 1 for bucking operation and the second pair of fields and the other amplistat being connected for boosting operation. This combination removes the necessity for having non-useful currents in two field windings as in Fig. 3, but at the same time increases the duty on the two field windings actively used for control; in addition, of course, it further complicates the machine windings. Another possible modification is the use of bridge connected field windings to introduce signals other than bucking and boosting signals to the generator excitation system.

It is recognized that this new and novel excitation arrangement in any of the forms illustrated requires more self-excitation current than self-excitation with a single field winding in a conventional manner. In the arrangements shown in both Figs. 1 and 3, twice as much self-excitation current is required as would be required with a single field winding. However, the use of additional current in this manner often is justifiable in order to reduce the size of the control device or devices.

There is shown in Fig. 4 of the drawing a regulating system embodying the excitation arrangement of Fig. 3. It is believed that the operation of this regulating system will be readily understood by reference to the previous discussion of the operation of Fig. 2 except, perhaps, for the operation of a pair of rectifiers 53 and 54 in circuit respectively with control windings 49 and 51. When employing the excitation arrangement of Fig. 3 in a regulator it is generally desirable that it be possible to turn the amplistats 44 and 45 on only individually and not simultaneously. Rectifiers 53 and 54 provide for such operation.

In the operation of the regulating system of Fig. 4, the output voltage of exciter 10 is ordinarily adjusted, by means of field rheostat 17, for an intermediate value corresponding to a predetermined setting of adjustable resistor 39 which produces the desired output terminal voltage from generator 30. If the voltage of generator 30 increases above this desired value, the voltage drop across resistor 36 exceeds that across resistor 39 with the result that rectifier 53 permits saturating current to flow through control winding 49; this causes buck amplistat 44 to oppose the self-excitation of exciter 10 and thus restores the voltage of generator 30 to the desired value. At the same time, rectifier 54 blocks current from flowing through control winding 51 on the other amplistat so that it is not turned on. In the event that the voltage of generator 30 drops below the desired value, the voltage drop across resistor 39 exceeds that across 36 and rectifier 54 then permits current to flow through saturating winding 51 on boost amplistat 45 and turn this amplistat on to restore the generator voltage to normal. In the latter case, rectifier 53 prevents current from flowing through control winding 49 on the buck amplistat.

While I have illustrated and described certain preferred embodiments of my invention, and have suggested numerous modifications, many other modifications will occur to those skilled in the art. For example, it will be apparent that the excitation system described and claimed herein is not limited to use with a self-excited direct current dynamoelectric machine but is useful as well for other dynamoelectric machines, both separately and self-excited, and also for magnetic circuits forming portions of devices other than dynamoelectric machines. In addition, it will be apparent that the excitation system covered hereby is not limited to the use of magnetic amplifiers as the control devices therefor, and that electronic amplifiers, rotating amplifiers (or amplidynes) and other well known control devices may be used.

Therefore, it should be understood that I desire not to be limited to the specific embodiments of the invention disclosed herein, but wish to cover by the appended claims all modifications which fall within the true spirit and scope of my invention.

What I claim as new and desire to secure by Letters Patent of the United States is:

1. A voltage regulating system for a generator having a self-excited exciter comprising, a pair of excitation windings for said exciter having substantially equal resistances and equal numbers of turns, circuit means connecting said windings in parallel between the exciter armature terminals, said windings being arranged on the exciter in a manner such that a change in the exciter armature voltage affects the magnetic flux produced by each winding in the same sense, a first resistor having a value of resistance substantially equal to the value of resistance of one of said windings connected in circuit between one of the said exciter terminals and a first one of said windings, a second resistor having a value of resistance approximately equal to the resistance of said first resistor connected between the second said winding and the other said terminal, means for deriving a voltage signal responsive to the armature voltage of the generator, means for deriving a reference voltage signal, and means responsive to the difference between the two voltage signals for circulating control current between the junction of said first resistor and said first winding and the junction of the second said winding and said second resistor, such control current dividing approximately equally between one branch circuit comprising the second said winding and said first resistor and another branch circuit comprising said second resistor and the first said winding.

2. An excitation arrangement for a dynamoelectric machine having three field windings which coact in providing at least a portion of the excitation for the machine, comprising connections to a source of unidirectional potential for energizing said three windings in parallel, said connections being arranged so that a change in the voltage of the source affects the component of flux produced in the machine excitation circuit by each winding in the same sense, first impedance means connected between one side of said source and one of said windings, second impedance means connected between a second winding and the other side of said source, third impedance means connected between said one side of said source and the third winding, first control current producing means connected between the common junction of said first impedance means and the first said winding and the common junction of said second winding and said second impedance means, and second control current producing means connected between the common junction of said second winding and said second impedance means and the common junction of said third impedance means and said third winding.

3. An excitation arrangement for a magnetic circuit having three excitation windings which coact in providing at least a portion of the flux in the magnetic circuit, comprising connections to a source of unidirectional potential for energizing said three windings in parallel, said connections being arranged so that a change in the voltage of the source affects the component of flux produced in the magnetic circuit by each winding in the same sense, first impedance means connected between one side of said source and a first one of said windings, second impedance means connected between a second winding and the other side of said source, third impedance means connected between said one side of said source and the third winding, first control current producing means connected between the junction of said first impedance means and said first winding and the junction of said second winding and said second impedance means, and second control current producing means connected between the second said junction and the junction of said third impedance means and said third winding.

4. A voltage regulating system for a generator having a self-excited exciter provided with three excitation field windings arranged to be energized in parallel and having approximately equal resistances and equal numbers of turns, the three field windings being arranged so that a change in the armature voltage of the exciter changes the magnetic flux produced in the exciter by all three windings in the same sense, the system comprising a first resistor having a value of resistance substantially equal to the resistance of one of the field windings connected in circuit between one exciter armature terminal and a first one of the windings, a second resistor having a value of resistance substantially equal to the resistance of said first resistor connected between a second winding and the other terminal of the exciter, a third resistor having a value of resistance substantially equal to the resistance of said first resistor connected between the said one terminal and the third winding, means for deriving a signal voltage responsive to the armature voltage of said generator, means for deriving a reference voltage, first control current producing means including a self-saturating magnetic amplifier connected between the junction of said first resistor and said first winding and the junction of said second winding and said second resistor for circulating control current between said junctions when one of said signal voltages exceeds the other signal voltage, and second control current producing means including a second self-saturating magnetic amplifier connected between the second said junction and the junction of said third resistor and said third winding for circulating a control current between the last said junction and the second said junction when said other signal voltage exceeds said one signal voltage.

References Cited in the file of this patent

UNITED STATES PATENTS

| | | |
|---|---|---|
| 2,095,674 | O'Hagan | Oct. 12, 1937 |
| 2,519,379 | King | Aug. 22, 1950 |